United States Patent
Sasaki

(10) Patent No.: US 7,221,358 B2
(45) Date of Patent: May 22, 2007

(54) IN-VEHICLE DIGITAL BROADCAST RECEPTION APPARATUS

(75) Inventor: Mitsuru Sasaki, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 667 days.

(21) Appl. No.: 10/664,925

(22) Filed: Sep. 22, 2003

(65) Prior Publication Data

US 2004/0056848 A1 Mar. 25, 2004

(30) Foreign Application Priority Data

Sep. 24, 2002 (JP) ............... 2002-277859

(51) Int. Cl.
*G09G 5/00* (2006.01)
(52) U.S. Cl. ..................... 345/173; 455/3.01
(58) Field of Classification Search ........ 345/173–183; 455/3.01–3.06; 340/426.13, 426.16; 701/1, 701/200, 211
See application file for complete search history.

(56) References Cited

U.S. PATENT DOCUMENTS 6,711,379 B1 * 3/2004 Owa et al. ............. 455/3.01
2003/0063073 A1 * 4/2003 Geaghan et al. ............ 345/173

FOREIGN PATENT DOCUMENTS

| JP | A 9-44307 | 2/1997 |
| JP | A 2000-148347 | 5/2000 |

* cited by examiner

*Primary Examiner*—Kevin M. Nguyen
(74) *Attorney, Agent, or Firm*—Oliff & Berridge, PLC

(57) ABSTRACT

A display and a touch panel can replace operation of a remote control. Conversion/management analyzes BML description for realizing the software remote control function corresponding to operation of a special key of the remote control on display with a BML browser and makes function assignment of the touch panel. When event elements are crowded, the proximity of the specified position is once enlarged for preventing erroneous operation from occurring.

21 Claims, 10 Drawing Sheets

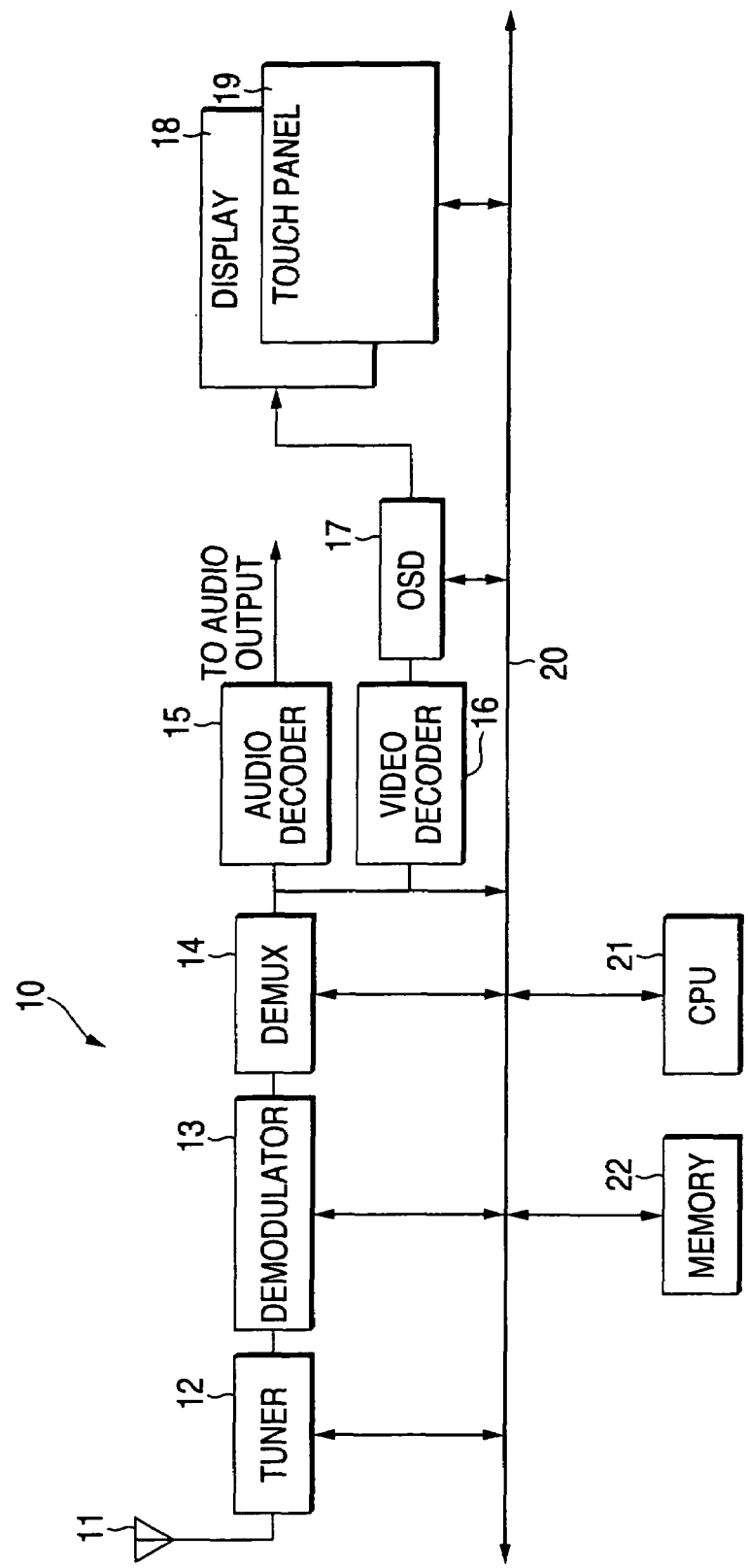

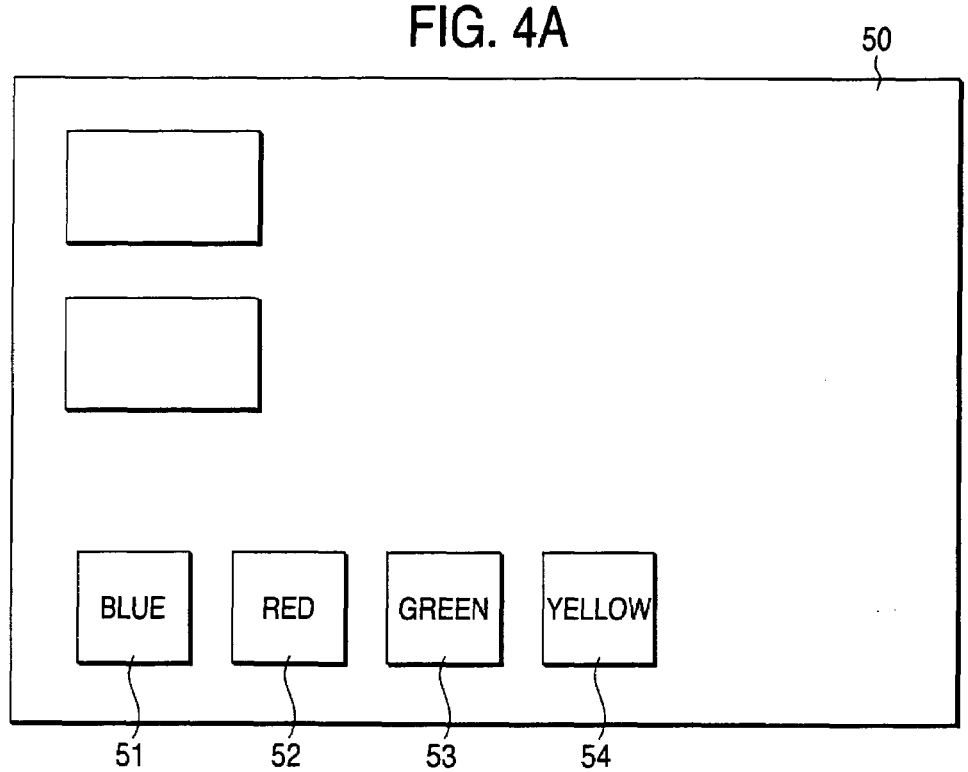
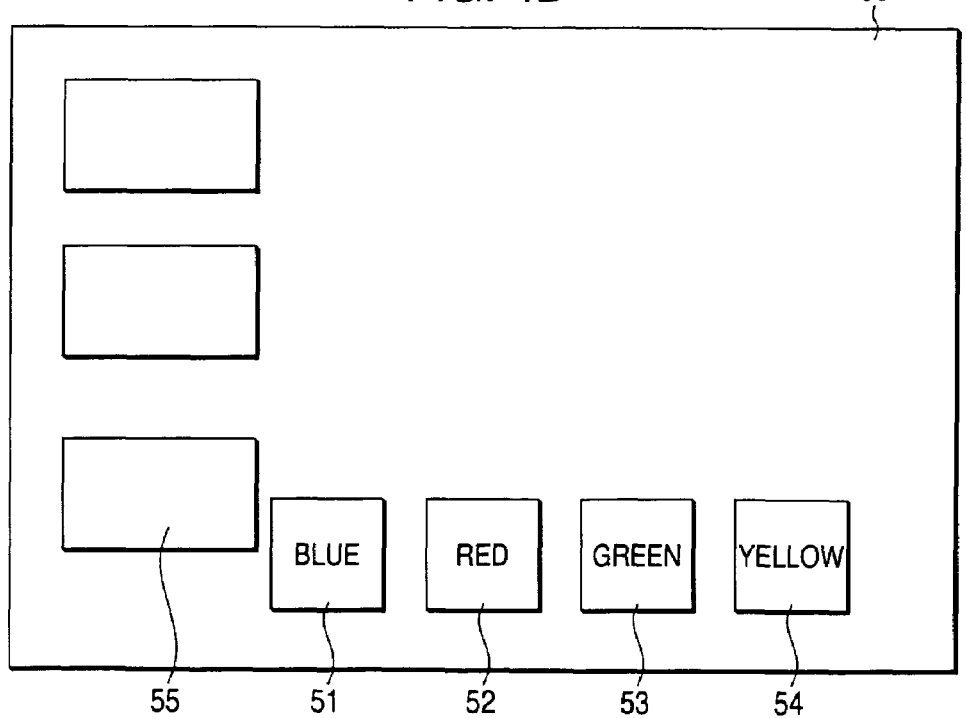

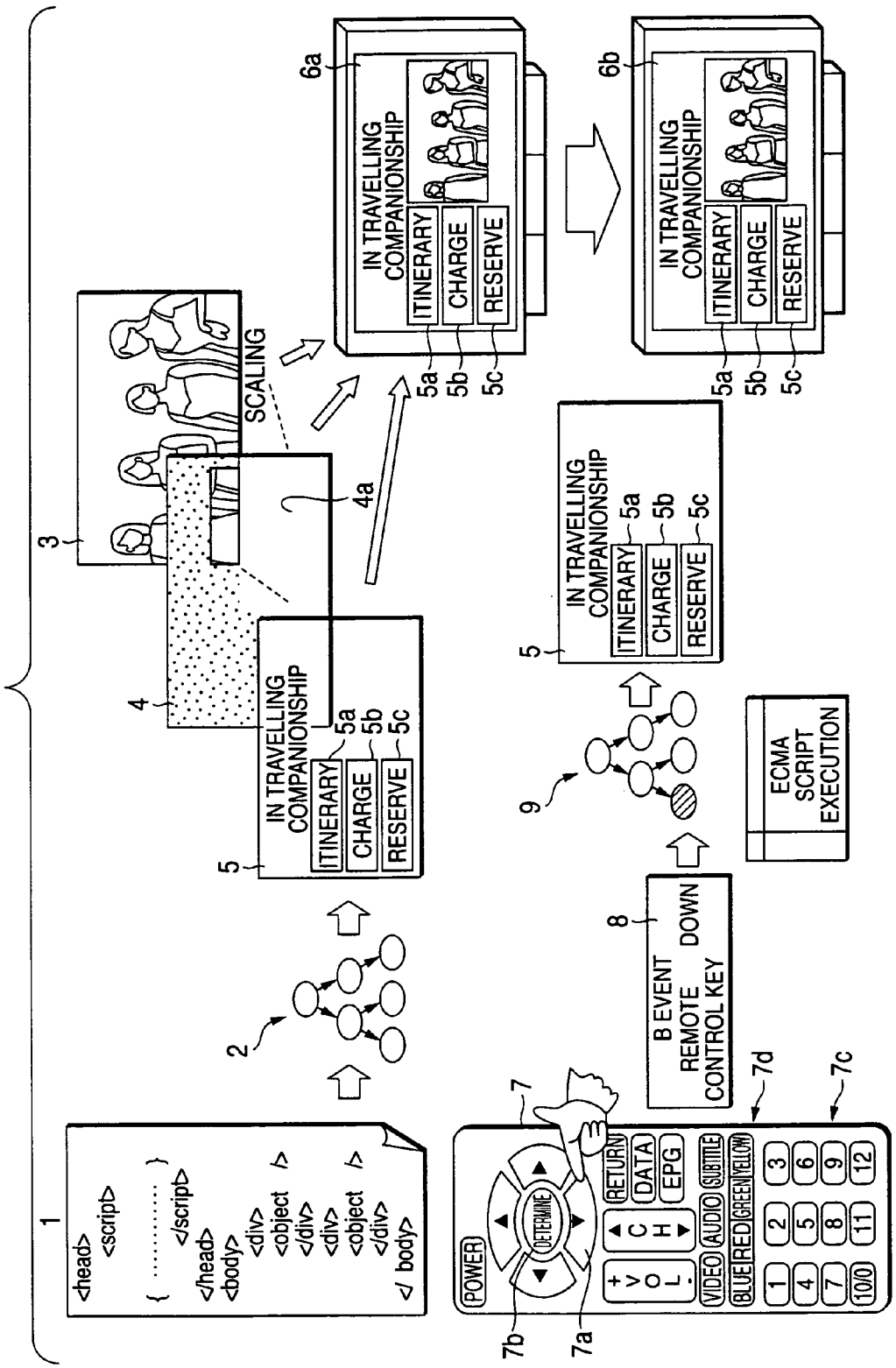

IN-VEHICLE DIGITAL BROADCAST RECEPTION APPARATUS

The present disclosure relates to the subject matter contained in Japanese Patent Application No.2002-277859 filed on Sep. 24, 2002, which is incorporated herein by reference in its entirety.

BACKGROUND OF THE INVENTION

1. Field of the Invention

This invention relates to an in-vehicle digital broadcast reception apparatus for receiving a satellite digital broadcast and a ground digital broadcast.

2. Description of the Related Art

Hitherto, BS (Broadcasting Satellite) digital broadcasts from broadcasting satellites, CS (Communication Satellite) digital broadcasts from communication satellites, and the like have been carried out as satellite digital broadcasts using artificial satellites in geostationary orbits. Start preparation for ground digital broadcasts for conducting digital broadcasts through antennas installed on the ground is also being advanced. Association of Radio Industries and Businesses (ARIB) advances standardization work for the digital broadcasts, and the technique of ISO (International Standards Organization) 13818 called MPEG2 of color moving picture compression techniques internationally defined by MPEG (Moving Picture Experts Group) is adopted. In MPEG2, coded video and audio are put into a packet and the packet is transmitted in the TS (Transport Stream) format of a fixed length suitable for transmission.

FIG. 10 shows a configuration of an MPEG-TS signal transmitted in a digital broadcast. In the MPEG-TS signal, contents of a plurality of services and programs containing video, audio, and data can be multiplexed for transmission. The data of each service or program is divided into a plurality of TS packets. Each TS packet has a fixed length of 188 bytes and contains a four-byte packet header. The packet header contains a packet identifier (PID) to make it possible to identify the TS packet. The TS packets having the same PID provide the data of the same service or program. As special information identified by the PID of the TS packet, PSI (Program Specific Information) and SI (Service Information) are also used to facilitate selection and viewing out of a large number of types of services and programs. Further, service, called EPG (Electronic Program Guide), for providing a function for enabling the user to peruse, search, and preselect a program scheduled for broadcast is also available. Information of SI is used for the EPG. The data broadcast with the MPEG-TS signal is described using a document description language called BML (Broadcast Markup Language). The EPG can also be provided using the BML.

FIG. 11 shows an outline of a data broadcast using the BML. The description with tags as shown as BLM DOCUMENT 1 is transmitted as the data in the MPEG-TS signal as shown in FIG. 10. It is assumed that the description of BLM DOCUMENT 1 defines relationships among objects as shown as OBJECT TREE 2, for example, and specifically defines superposing of MOVING PICTURE PLANE 3, STILL PICTURE PLANE 4, and TEXT/GRAPHICS PLANE 5 to generate display screens 6a and 6b. As a moving picture displayed on the MOVING PICTURE PLANE 3, an image transmitted as video in the MPEG-TS signal can be used. In the STILL PICTURE PLANE 4, a background image and a window formed by clipping a part of the background image are transmitted as data. In the TEXT/GRAPHICS PLANE 5, data for button display of ITINERARY 5a, CHARGE 5b, and RESERVE 5c is transmitted as event elements. Any of the event elements is to be selected by the viewer and in the initial state, focus display such that ITINERARY 5a at the top is selected is produced, for example. The display screen 6a is formed by superposing MOVING PICTURE PLANE 3, STILL PICTURE PLANE 4, and TEXT/GRAPHICS PLANE 5 in order with the focus display of ITINERARY 5a. The moving picture on MOVING PICTURE PLANE 3 is scaled down to a window 4a of STILL PICTURE PLANE 4.

On the display screen 6a, the user can change event element selection by operating a remote control 7. When the viewer presses a downward arrow key 7a of the remote control 7, an event 8 of remote control key down occurs. As response operation 9, the focus moves to CHARGE 5b below ITINERARY 5a on TEXT/GRAPHICS PLANE 5, and the whole display screen 6b is displayed. When the viewer presses a DETERMINE key 7b of the remote control 7, the operation corresponding to the focus-displayed event element at the time is performed. This operation is described in BLM DOCUMENT 1. For example, when ITINERARY 5a is selected, a tour itinerary is displayed; when CHARGE 5b is selected, the tour charge is displayed. The remote control 7 is also provided with numeric keys 7c for entering a numeric value, special keys called color buttons 7d of blue, red, green, and yellow, and the like.

The data broadcast realized using the BML as shown in FIG. 11 is intended to be received at a home television receiver and it is assumed that the remote control 7 is used to operate the data broadcast. On the other hand, a digital broadcast can also be received at a mobile unit and a data broadcast can also be provided; it is expected that the broadcast will be used effectively to convey traffic information, etc. However, to operate an in-vehicle receiver, preferably a touch panel rather than a remote control is used considering safety.

A touch panel is formed on the surface of a liquid crystal display, etc. (see JP-A-Hei. 9-44307) The touch panel is, for example, a transparent resistance film and as the resistance value is lowered because of a contact pressure, the touch position is detected. To guide the operator as to which part of the touch panel is to be touched, an operation image of buttons, etc., is displayed on the display. The display with the touch panel also produces image display on the surface of in-vehicle machine for the necessity of operation. As for a touch panel using a large plasma display panel (PDP), function expansion is also proposed. (see JP-A-2000-148347)

In a digital broadcast, data described in the BML is transmitted assuming that the user operates the remote control 7, as described above. However, with an in-vehicle machine having the remote control 7, an operation fitted for a data broadcast cannot be performed, and data cannot be used effectively.

SUMMARY OF THE INVENTION

It is an object of the invention to provide an in-vehicle digital broadcast reception apparatus for making it possible to effectively use broadcast data assuming that a remote control is used in a digital broadcast, such as data described in BML.

According to the embodiments of the invention, an in-vehicle digital broadcast reception apparatus receives a digital broadcast containing image information for an input operation. The image information accepts the input operation of a user, provides broadcast information reflecting the input operation result, and is prepared to presume that the user operates a key of a remote control having a predetermined function. The in-vehicle digital broadcast reception apparatus includes a touch panel, a display unit, an analysis unit, and a control unit. The touch panel enables the user to touch a surface of the touch panel for performing the input operation. The display unit displays the image information for the input operation. The analysis unit analyzes an operation concerning the remote control contained in the image information for the input operation and pseudo-assigning a function of the input operation to the remote control to a touch operation area of the touch panel on the basis of the analysis result. The control unit is responsive to the touch operation to the touch panel. The control unit makes a response corresponding to the pseudo input operation to the remote control in response to the touched area of the touch panel according to the assignment of the analysis unit.

Accordingly, it is made possible to effectively use broadcast data assuming that the remote control is used in a digital broadcast, without using the remote control.

According to the embodiments of the invention, the digital broadcast may contain the image information for the input operation as a content described in a predetermined document description language for broadcast. The content may be associated with an event caused by the input operation to the remote control. The touch panel may be placed on a surface of a screen on which the display unit displays the image information for the input operation. The analysis unit may display an operation guide on the display unit corresponding to the area assignment. When the user touches an area of the touch panel corresponding to the operation guide display, the control unit may cause an event, which is caused by the input operation to the remote control assigned to the area of the touch panel corresponding to the operation guide display.

Accordingly, the receiving person can perform a similar operation to that with the remote control without using the remote control.

According to the embodiments of the invention, when input operation functions of the remote control contains an input operation function, which is assigned to no area by the analysis of the operation concerning the remote control, the analysis unit may assign a touch operation area of the touch panel for a software remote control function to the input operation function, which is assigned to no area by the analysis of the operation concerning the remote control. The analysis unit may display an operation guide of the software remote control function on the display unit corresponding to the touch operation area for the software remote control function area.

According to the embodiments of the invention, the remote control assumed to be used in a data broadcast is provided with numeric keys and special keys of color keys. Often the special keys are not contained in display of the image information for the input operation only to select an event element. If the special keys are not contained in event elements, when any of the special keys is pressed as an input operation to the remote control, the response operation set in the special key is performed. If the image information for the input operation does not contain description of element display in the BML corresponding to the special keys, the analysis unit enables the user to operate the touch panel as the software remote control function. Therefore, even such an event whose display is not described in the operation input image information can be caused to occur as the user operates the touch panel.

According to the embodiments of the invention, the analysis unit may assign the touch operation area for the software remote control function to the touch panel so as not to overlap the area assigned by analyzing the operation.

Therefore, the user can easily distinguish an input operation to the software remote control from an operation on an event element based on the image information for the input operation.

According to the embodiments of the invention, if an appropriate area assigned to the software remote control function does not exist in the touch panel, the analysis unit may move an assigned area every given time.

According to the invention, if the event element area and the software remote control function area must overlap on the touch panel, the area assigned for the software remote control function is moved every given time. Therefore, if the image under and hidden by the operation guide display for the software remote control function does not appear, it is made possible to see after the expiration of the given time.

According to the embodiments of the invention, when the user does not perform an input operation to the software remote control function within a predetermined time, the analysis unit may stop the assignment to the software remote control function and also may stop the operation guide display for the software remote control function.

Therefore, the display means produces only display based on the image information for the input operation, and complicated display caused by the software remote control function, which is not operated, can be circumvented.

According to the embodiments of the invention, the analysis unit may assign an area for starting the software remote control function to an area of the touch panel where the display unit does not display the image information for the input operation. When the control unit detects a touch operation to the area for starting the software remote control function, the software remote control function may be started.

Since the software remote control function can be started when the user touches the area of the touch panel corresponding to any area other than the area where the image information for the input operation is displayed on the display, the user can appropriately select the software remote control function as required.

According to the embodiments of the invention, the in-vehicle digital broadcast reception apparatus may further include a voice recognition unit for recognizing voice input. The analysis unit may start the software remote control function when the voice recognition unit recognizes a predetermined instruction.

If the user gives a voice instruction for starting the software remote control function to the voice recognition unit for recognizing voice input, the digital broadcast receiving person can start the software remote control function without touching the touch panel and can appropriately select the software remote control function as required.

According to the embodiment of the invention, the analysis unit may switch the assignment to the operation guide display on the display unit corresponding to the touch panel area assigned for the software remote control function between effectiveness and ineffectiveness at preset time intervals.

Even if it is impossible to assign the software remote control function to areas of the touch panel so that the software remote control function does not overlap the image information for the input operation, the software remote control function is effective at a predetermined interval. Thus, the software remote control function is available. If the software remote control function becomes effective, after elapse of a predetermined time, the software remote control function becomes ineffective again. Therefore, the entire image information for the input operation can be displayed without being hidden by the operation guide for the software remote control function.

According to the embodiments of the invention, the analysis unit may display on the display unit a cursor and an event element, which is associated with a predetermined event and can be specified based on a position of the cursor. The analysis unit may associate a movement of a touch position of the touch panel detected by the control unit with an event for the remote control to move the cursor. The analysis unit may associate an operation of stopping touch of the touch panel and breaking away from the touch panel detected by the control unit with an event for the remote control to determine the event element at the cursor position.

An operation of moving the cursor by operating an arrow key of the remote control and operating the DETERMINE key to select the event element pointed to by the cursor can be substituted with an operation of moving the touch position while touching the touch panel and then breaking away from the touch panel to select the event element indicated at the position.

The control unit may determine as to whether or not the event element exists in the image information for the input operation on the display unit corresponding to a position where the user stops touch of the touch panel and breaks away from the touch panel. When the control unit determines that the event element does not exist, the control unit may not interpret user's operation as the determination operation.

If an event element does not exist at the position where the user breaks away from touch of the touch panel, an event element is assumed to be unselected and the selection operation can be canceled as a state in which the DETERMINE key of the remote control is not pressed.

According to the embodiments of the invention, the analysis unit displays an event element on the display unit in a display mode so that the event element is distinguished from other images.

An event element corresponding to some event is displayed in a mode for enabling the user to distinguish the event element from other images, for example, as predetermined marking processing is performed. Therefore, the user can determine which element of the display elements can be operated at a glance in such a manner that the fill display color is changed.

In a preferred example, the analysis unit displays the event element in a mode of changing the fill display color. In this case, the element filling color can be changed so as to enable the user to easily distinguish the event element from other elements.

In another preferred example, the reception apparatus further includes a change acceptance unit for accepting filling color change specification. The analysis unit changes the filling color of the event element displayed on the display unit for displaying the event element in response to change specification accepted at the change acceptance unit. In this case, the user can specify any color so as to reflect his or her liking or change the color of the event element hard to see.

According to the embodiments of the invention, the analysis unit may determine as to whether or not assignment of touch areas of the touch panel based on the analysis result is crowded in accordance with a predetermined criterion. When the analysis unit determines that the assignment of the touch areas is crowded, the analysis unit may perform a re-assignment with enlarging the vicinity of the touch areas in response to a first touch detection of the control unit. The control unit may make the response in response to a detection result of touch of the re-assigned area by the analysis unit.

If the area of the touch panel assigned as event elements is crowded, it is considered that which event element is selected cannot be determined and malfunction occurs depending on the resolution of the display unit and the resolution of the touch panel. If it is determined that the assignment of touch areas is crowded according to the predetermined criterion, when the first touch is detected, re-assignment is made so as to enlarge the touch detection position vicinity, and the operation of event element selection is determined based on detection of contact position for the re-assignment result. Therefore, the operation surely reflecting the intention of the digital broadcast receiving person can be selected.

When the control unit does not detect the touch operation of the touch panel within a predetermined time range after the re-assignment, the analysis unit may stop the area re-assignment.

If the position of the touch panel that the user first touches is not appropriate and any desired operation cannot be performed as the touch position vicinity is enlarged, when the predetermined time has elapsed, re-assignment is stopped and the assignment is restored to the former assignment state, so that unnecessary operation can be skipped.

BRIEF DESCRIPTION OF THE DRAWINGS

FIGS. 1A and 1B are block diagrams to schematically show the hardware configuration and the software configuration of an in-vehicle digital broadcast reception apparatus 10 of one embodiment of the invention.

FIGS. 4A and 4B are drawings to show examples of a display screen 50 displayed in the software remote control function in the embodiment in FIG. 1.

FIG. 11 is a drawing to show an outline of a BML for describing data in a digital broadcast.

DETAILED DESCRIPTION OF THE PREFERRED EMBODIMENTS

Figure 1B:
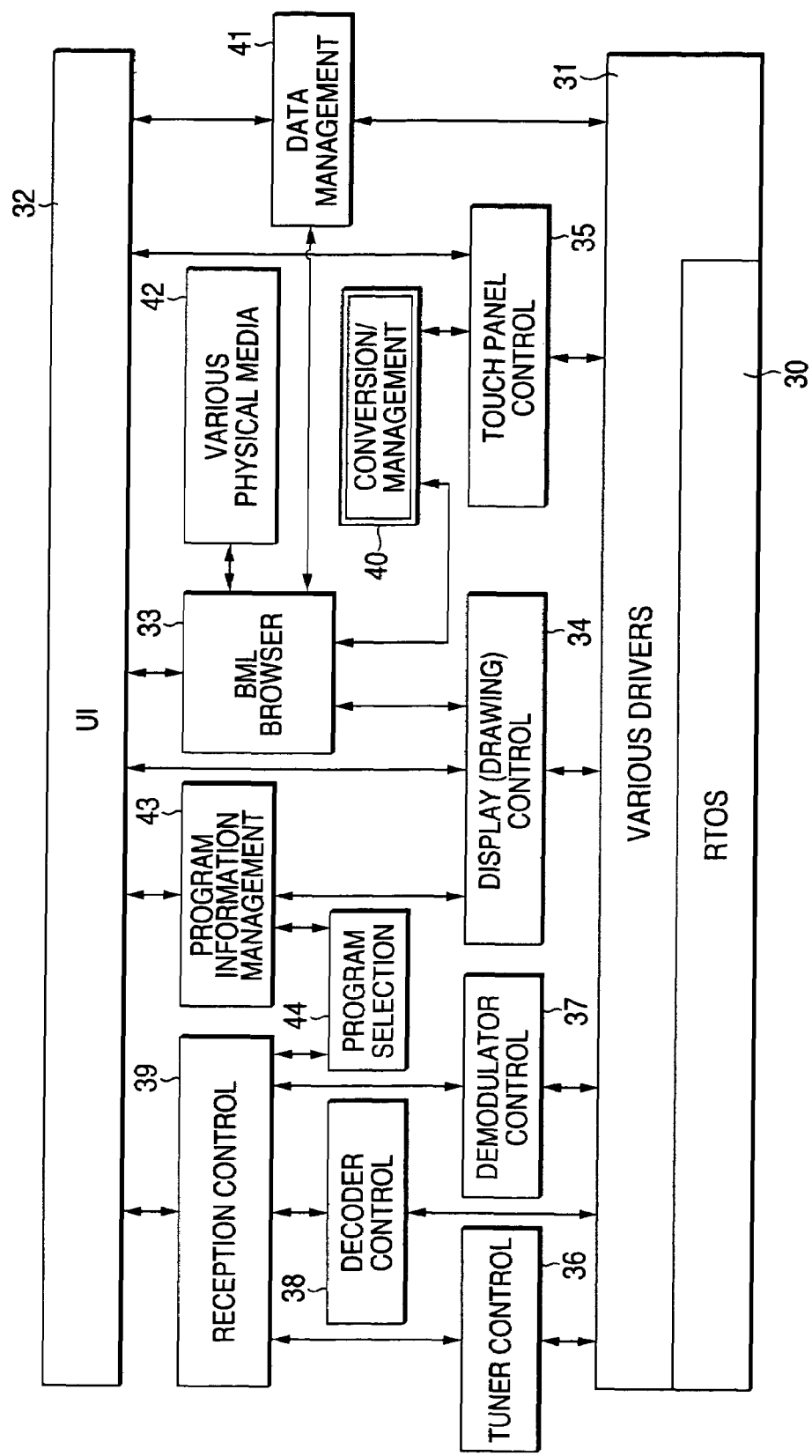
Figure 10:
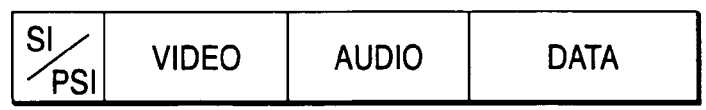
FIG. 10 is a drawing to show an MPEG-TS signal transmitted in a digital broadcast.

FIGS. 1A and 1B show the hardware configuration and the software configuration of an in-vehicle digital broadcast reception apparatus 10 as one embodiment of the invention. As shown in FIG. 1A, in the in-vehicle digital broadcast reception apparatus 10 of the embodiment, radio waves of a digital broadcast are received at an antenna 11 and are selected and amplified in a tuner 12. A demodulator 13 performs conversion into a digital signal. A DEMUX 14 separates data for each service type from a multiplexed state as shown in FIG. 10. An audio decoder 15 demodulates an audio signal and provides the audio signal as audio output. A video decoder 16 demodulates a video signal. An OSD (On-Screen Display) 17 performs superimposing processing. A display 18 displays an image. A transparent touch panel 19 is put on a display screen of the display 18.

A CPU 21 through a control bus 20 controls the described components of the in-vehicle digital broadcast reception apparatus 10. The CPU 21 performs a control operation in accordance with a program previously stored in ROM contained in memory 22. The memory 22 also contains RAM for temporarily storing data required for control.

Software components shown in FIG. 1B are implemented as the program operation of the CPU 21 is performed. The software is based on a real-time operating system, that is, RTOS 30 to which various drivers 31 are added as device drivers and further various programs are added, and a UI (User interface) 32 operates for interfacing with the digital broadcast receiving person using the touch panel 19. A BML browser 33 becomes the nucleus of the UI 32 for displaying data described in a BML as on the display screens 6a and 6b shown in FIG. 11 like Internet web pages. Control of the UI 32 containing the BML browser 33 is performed containing display (drawing) control 34, touch panel control 35, tuner control 36, demodulator control 37, decoder control 38, reception control 39, etc.

In the embodiment, conversion/management 40 is used in the BML browser 33. Assuming that a home television receiver and a remote control are used, the conversion/management 40 converts data for the BML browser 33 into data, which the display 18 and the touch panel 19 can be used. The data conversion also contains appropriate converting of an image assumed to be displayed on a screen of a home television receiver of 32 inch type having a width across corners of about 813 mm with 1080 pixels by 1920 pixels into an image to be displayed on the screen of the display 18 of 6.5 inch type having a width across corners of about 165 mm with 480 pixels by 800 pixels. To perform such conversion, data management 41 is performed and various physical media 42 are also used. Program information management 43 using an EPG, etc, together with the BML browser 33 is also performed and program selection 44, etc., is also made possible.

That is, an in-vehicle digital broadcast reception apparatus 10 according to the embodiments of the invention receives a digital broadcast containing image information for an input operation. The image information accepts the input operation of a user, provides broadcast information reflecting the input operation result, and is prepared to presume that the user operates a key of a remote control having a predetermined function. The in-vehicle digital broadcast reception apparatus includes the touch panel 19, the display 18, the conversion/management 40, and the CPU 21. The touch panel 19 enables the user to touch a surface of the touch panel for performing the input operation. The display 18 displays the image information for the input operation. The conversion/management 40 (an analysis unit) analyzes an operation concerning the remote control contained in the image information for the input operation and pseudo-assigning a function of the input operation to the remote control to a touch operation area of the touch panel 18 on the basis of the analysis result. CPU 21 (a control unit) is responsive to the touch operation to the touch panel. CPU 21 makes a response corresponding to the pseudo input operation to the remote control in response to the touched area of the touch panel 18 according to the assignment of the conversion/management 40.

The in-vehicle digital broadcast reception apparatus 10 assigns the function of the input operation to the remote control to an area of the touch panel 19 by the conversion/management 40. If the user touches the assignment area, the in-vehicle digital broadcast reception apparatus 10 executes an operation corresponding to a pseudo input operation to a remote control. Therefore, it is made possible to effectively use broadcast data, which assumes that the remote control is used and is broadcast in a digital broadcast, without using the remote control.

Figure 2:
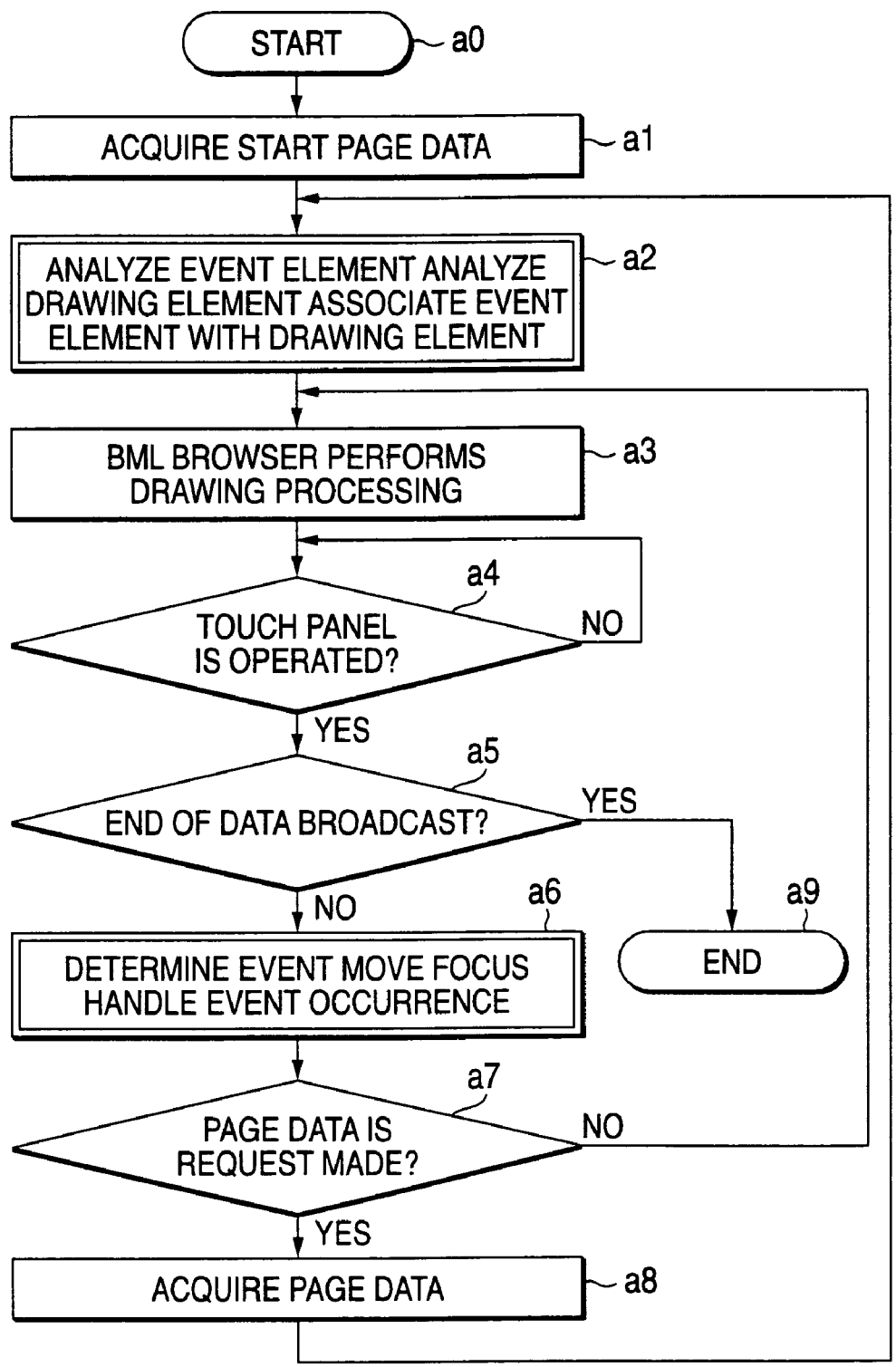
FIG. 2 is a flowchart to show a basic operation procedure of an UI 32 in the embodiment in FIG. 1.

FIG. 2 shows a basic operation procedure of the UI 32 in the embodiment. The procedure is started at step a0. At a1, start page data is acquired from a portion of the data of MPEG-TS shown in FIG. 10. At step a2, the conversion/management 40 analyzes an event element contained in the acquired data, analyzes a drawing element, and associates the event and drawing with each other. At step a3, the BML browser 33 performs drawing processing. At step a4, whether or not the touch panel 19 is operated is determined repeatedly until the touch panel 19 is operated. When the touch panel 19 is operated, whether or not data broadcast terminates is determined. If data broadcast does not terminate, the event is determined, the focus for distinguishing the selected element from others on the display is moved, and event occurrence is handled at step a6. At step a7, it is determined as to whether or not a page data request is made in the event occurrence. If the page data request is not made, control returns to step a3; if a page data request is made, new page data is acquired from the MPEG-TS signal at step a8 and control returns to step a2. When it is determined at step a5 that data broadcast terminates, the procedure is terminated at step a9.

That is, the digital broadcast received in the embodiment, contains the image information for the input operation as content, which is associated with an event caused by an input operation to the remote control and is described in the BML of a broadcast document description language. The touch panel 19 is placed on a surface of the screen of the display 18 for displaying the image information for the input operation. The BML browser 33 displays an operation guide on the display 18 corresponding to area assignment on the touch panel 19 by the conversion/management 40. When the user touches the area of the touch panel 19 corresponding to the operation guide display, the CPU 21 controls the digital broadcast reception apparatus so as to generate an event caused by an input operation to the remote control, which is pseudo-assigned to the area,. Since the touch panel 19 is placed on the surface of the screen of the display 18 for displaying the image information for the input operation, if the user touches the area of the touch panel 19 on button display instead of selecting and determining with the remote control, the user can directly perform a selection operation with respect to the image information for the input operation. When the user touches the area of the touch panel 19 corresponding to the operation guide display, the CPU 21 controls the reception apparatus so as to generate an event caused by an input operation to the remote control, which is pseudo-assigned to the area. Therefore, the user can perform a similar operation to that with the remote control without using the remote control.

Figure 3:
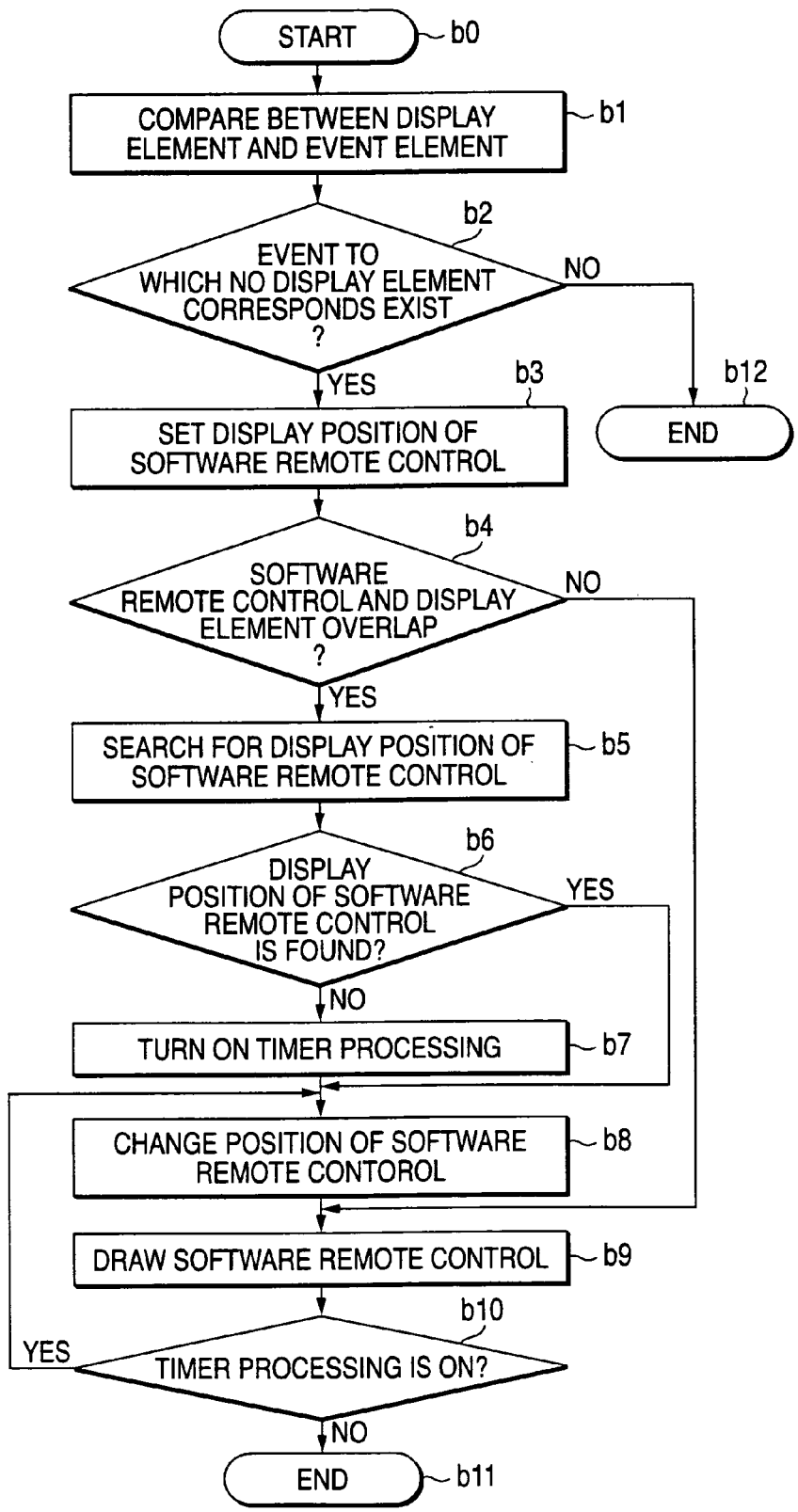
FIG. 3 is a flowchart to show a control procedure of a software remote control function in the embodiment in FIG. 1.

FIG. 3 shows an operation procedure of the conversion/management 40 for realizing the function of a software remote control in the embodiment. The procedure is started at step b0. At step b1, the conversion/management 40 makes a comparison between the display element and the event element, which are analyzed at step a2 in FIG. 2. At step b2, the conversion/management 40 determines as to whether or not an event to which no display element corresponds exists. The expression "event to which no display element corresponds" is used to mean an operation of pressing any of special keys such as the numeric keys 7c and the color buttons 7d on the remote control 7 in FIG. 11, for example. When such an event exists, the display position of the software remote control is first set to a default position at step b3. At step b4, it is determined as to whether or not the software remote control at the default position and the display element displayed according to the BML overlap. If it is determined that they overlap, at step b5, a search is made for another display position of the software remote control where the software remote control does not overlap the display element. At step b6, it is determined as to whether or not the another display position where the software remote control does not overlap the display element exists. If it is determined that the another display position does not exist, a timer processing is turned on at step b7. Next, at step b8, the position of the software remote control is changed and at step b9, the software remote control is drawn.

If it is determined at step b6 that the another display position of the software remote control exists, step b7 is skipped and the position of the software remote control is changed at step b8. If it is determined that the another display position of the software remote control does not exist, a timer processing is turned on at step b7. If the timer processing is on, after step b9, control returns to step b8 from step b10. Then, the display position of the software remote control is changed. If the timer processing is not on, after step b10, the procedure is terminated at step b11.

If it is determined at step b4 that the software remote control at the default position and the display element do not overlap, the software remote control is drawn at the default position at step b9. Since the timer processing is not on, the procedure is terminated at step b11 through step b10. The software remote control is displayed at the default position, so that it can be made easy to understand for the digital broadcast receiving person. If it is determined at step b2 that an event to which no display element corresponds does not exist, the procedure is terminated at step b12.

FIGS. 4A and 4B show examples of the software remote control display corresponding to the color buttons 7d shown in FIG. 11. FIG. 4A shows a state in which software remote control buttons 51, 52, 53, and 54 are displayed at the default position on a display screen 50. FIG. 4B shows a state in which the display positions of the software remote control buttons 51, 52, 53, and 54 are changed to avoid a display element 55 displayed on the display screen 50. The positions of a part of the software remote control buttons 51, 52, 53, and 54 may be changed.

That is, when the input-operation function of the remote control contains an input-operation function assigned no area as a result of the analysis of the operation, the conversion/management 40 also assigns a touch operation area of the touch panel 19 to such input-operation function for the software remote control function. An operation guide of the software remote control function is displayed on the display 18 with corresponding to the area for the software remote control function. The remote control assumed to be used in a data broadcast is provided with numeric keys and special keys such as color keys. Often the special keys are not contained in display of the image information for the input operation, which is only used to select an event element as shown in FIG. 11. If the special keys are not contained in event elements, when any of the special keys is pressed as an input operation to the remote control, the response operation set in the special key needs to be performed.

If the image information for the input operation does not contain description of element display in the BML corresponding to the special keys, the conversion/management 40 enables the user to operate the touch panel 19 as the software remote control function. Therefore, even such an event whose display is not described in the image information for the input operation can be caused to occur as the user operates the touch panel 19.

To assign a software remote control function area of the touch panel 19, the conversion/management 40 changes the position of the software remote control function area so that the software remote control function area does not overlap the area assigned by analyzing the operation. Since the software remote control function area is assigned to the touch panel 19 so as not to overlap the area assigned by analyzing the operation, the user can easily distinguish an input operation to the software remote control from an operation on an event element based on the image information for the input operation.

If an area assigned for the software remote control function does not exist, the conversion/management 40 turns on a timer processing for moving the assigned area every given time. If it is impossible to arrange the event element area and the software remote control function area so as not to overlap on the touch panel 19, the area assigned for the software remote control function is moved every given time. Therefore, if the image under and hidden by the operation guide display for the software remote control function does not appear, it is made possible to see after the expiration of the given time.

Further, if there is not a touch panel area to be assigned for the software remote control function so as not to overlap display of the image information for the input operation, the software remote control function can also be made effective and ineffective repeatedly at preset time intervals. Accordingly, the software remote control function becomes effective and can be used at given time intervals. If the software remote control function becomes effective, after the expiration of the preset time, the software remote control function becomes ineffective and the operation guide display is also stopped. Therefore, the whole image information for the input operation can be displayed without being hidden by the operation guide display for the software remote control function.

Figure 5:
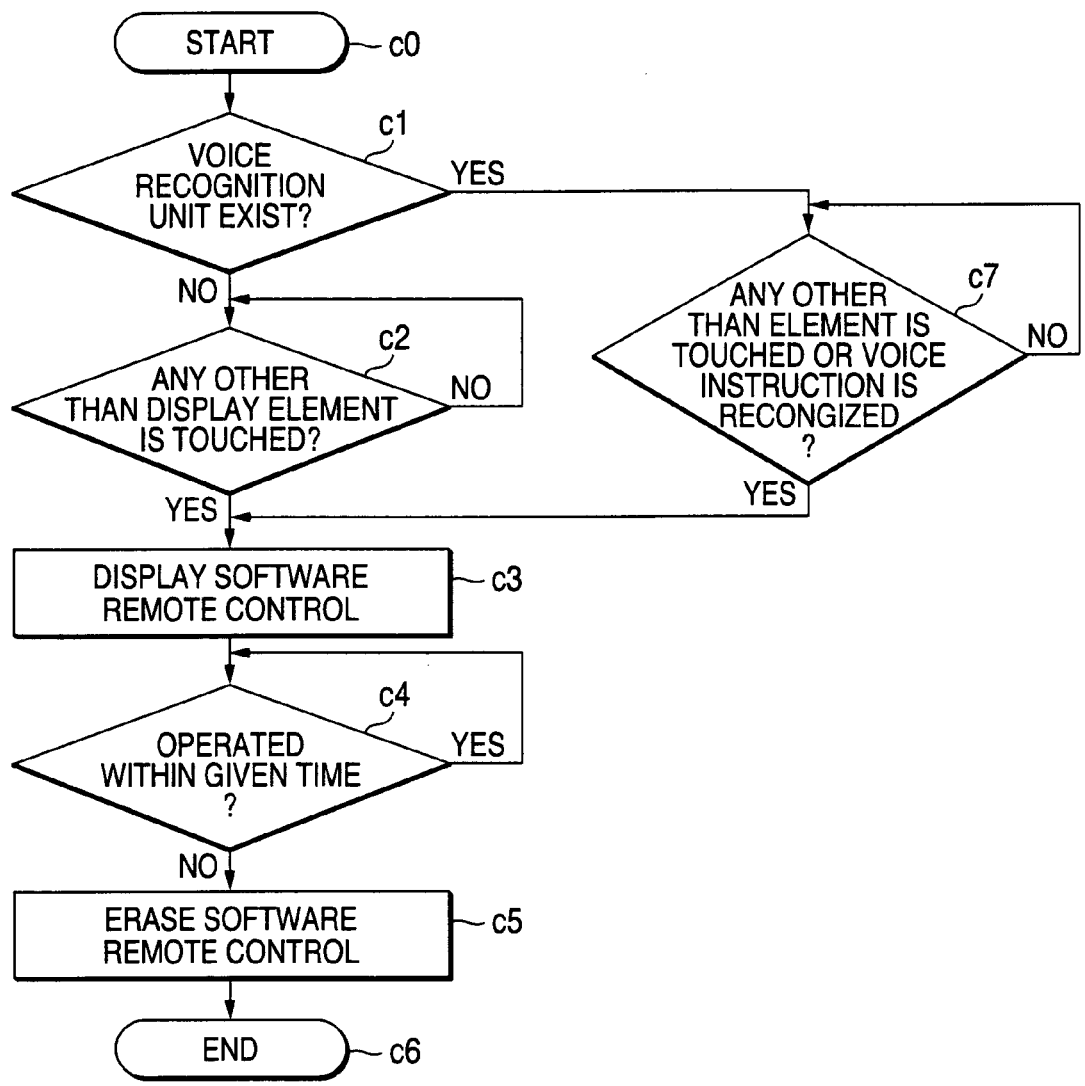
FIG. 5 is a flowchart to show a procedure of starting the software remote control function in the embodiment in FIG. 1.

FIG. 5 shows a control procedure of starting and stopping the software remote control function in response to a selection by the digital broadcast receiving person in the embodiment. The procedure is started at step c0. At step c1, it is determined as to whether or not a voice recognition unit exists. No voice recognition unit exists in the hardware configuration shown in FIG. 1A and therefore control goes to step c2. At step c2, it is determined repeatedly as to whether or not the user touches an area where no element is displayed on the display screen 50 in which, for example, the software remote control buttons 51, 52, 53, and 54 are not displayed in FIG. 4, until the user touches. When the user touches, the software remote control buttons 51, 52, 53, and 54 as shown in FIG. 4 are displayed at step c3. At step c4, it is determined repeatedly as to whether or not the user operates the software remote control button 51, 52, 53, 54 within a given time, until the user operates the software remote control or the given time has elapsed. When the user operates the software remote control button 51, 52, 53, 54 within the given time, the control proceeds to the step c4 and the step c4 is performed again from the beginning. When the given time has elapsed without any operation to the software remote control buttons 51, 52, 53 and 54, the control proceeds to step c5. Display of the software remote control buttons 51, 52, 53, and 54 is erased at step c5 and the procedure is terminated at step c6.

That is, when the user does not perform the input operation to the software remote control function within the predetermined time, the conversion/management 40 stops area assignment for the software remote control function and also stops the operation guide display for the software remote control function. Accordingly, the display 18 produces only display based on the image information for the input operation. Complicated display caused by the software remote control function, which is not operated, can be circumvented.

The conversion/management 40 assigns an area for starting the software remote control function to an area of the touch panel 19 corresponding to any area other than the area wherein the image information for the input operation is displayed on the display 18. When detecting the user touching the area, the conversion/management 40 starts the software remote control function. Since the software remote control function can be started in response to touching the area of the touch panel 19 corresponding to any area other than the area wherein the image information for the input operation is displayed on the display 18, the user, that is, the digital broadcast receiving person can appropriately select the software remote control function as required.

If it is determined at step c1 in FIG. 5 that a voice recognition unit exists, it is determined as to whether or not the user touches an area where no element is displayed at step c7 as with step c2 or it is determined as to whether or not a voice instruction is recognized. The determination is repeated until the user touches or a voice instruction is recognized. When the user touches or a voice instruction is recognized, the software remote control buttons 51, 52, 53, and 54 are displayed at step c3. Although no voice recognition unit is shown in FIG. 1A, a voice recognition function may be installed in an in-vehicle navigation system or a voice recognition unit can be added as an option in some cases.

That is, in the embodiment, if a voice recognition unit for recognizing voice input is further included, the conversion/management 40 can also start the software remote control function in response to the recognition result of a predetermined instruction by the voice recognition unit. Accordingly, if the digital broadcast receiving person gives a voice instruction for starting the software remote control function to the voice recognition unit for recognizing voice input, the digital broadcast receiving person can start the software remote control function without touching the touch panel 19 and can appropriately select the software remote control function as required.

Figure 6:
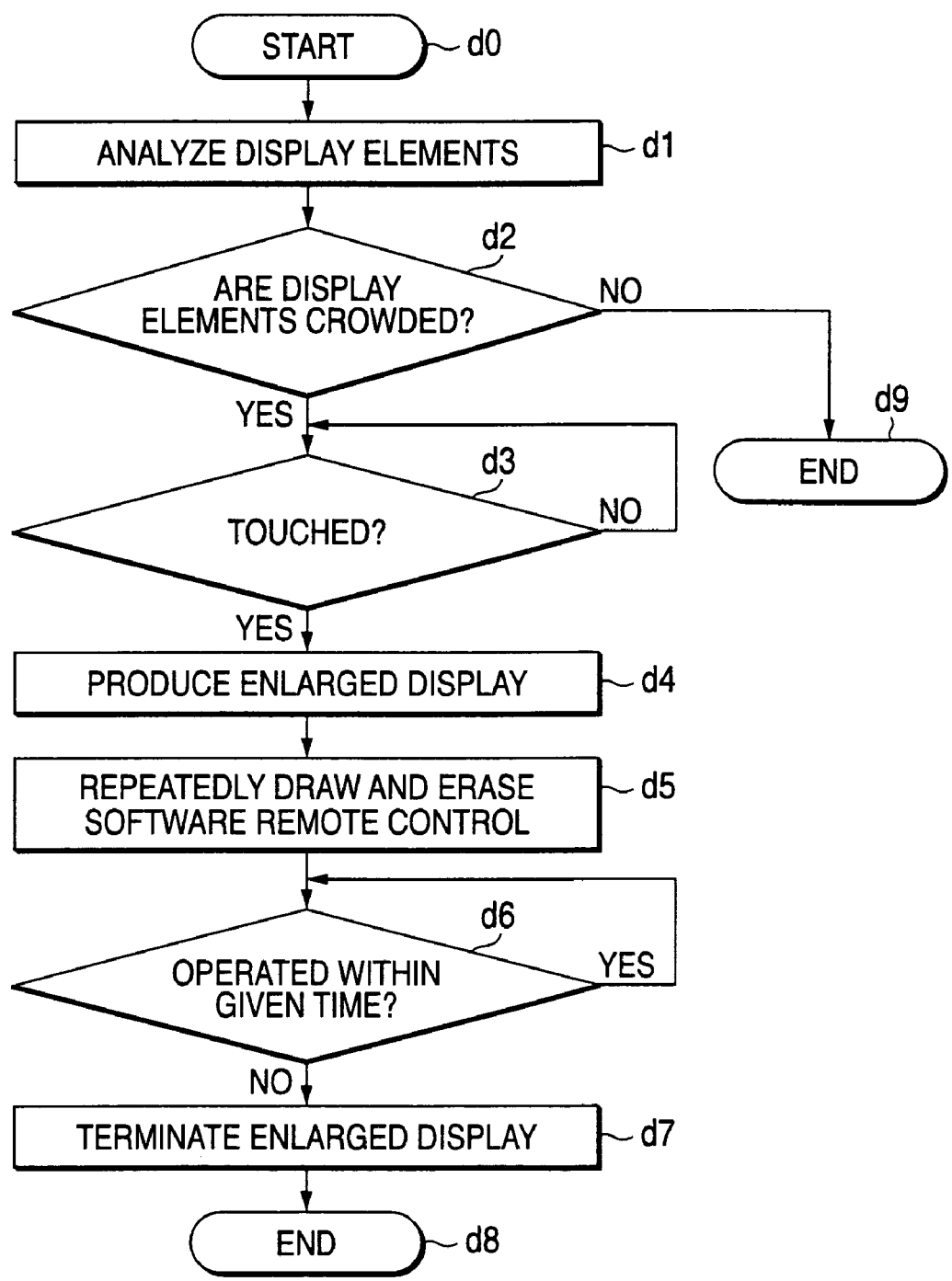
FIG. 6 is a flowchart to show a procedure of enlarging a crowded display element portion for operation thereon in the embodiment in FIG. 1.

FIG. 6 shows a control procedure of making the software remote control function in the embodiment easier to operate. The procedure is started at step d0. At step d1, the conversion/management 40 analyzes display elements as with at step a2 in FIG. 2. At step d3, it is determined as to whether or not the display elements are crowded based on a predetermined criterion. If it is determined that the display elements are crowded, control goes to step d3. It is determined continuously as to whether or not the user touches a crowded area until the user touches. When the user touches, the touched area vicinity is displayed on an enlarged scale at step d4. At step d5, the software remote control function is drawn and erased repeatedly at given time intervals as described above. At step d6, it is determined repeatedly as to whether or not the user operates the software remote control or the enlarged display element within a given time until the given time has elapsed or the user operates the software remote control or the enlarged display element. When the user operates the software remote control or the enlarged display element within the given time, the control goes to step d6 and step d6 is performed again from the beginning. When the given time has elapsed, the enlarged display is terminated at step d7 and the procedure is terminated at step d8. If it is determined at step d2 that the display elements are not crowded, the procedure is terminated at step d9 without producing enlarged display.

Figure 7:
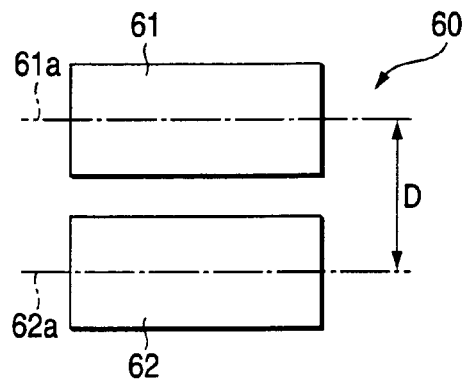
FIG. 7 is a drawing to show an example of a determination criterion as to whether or not display elements are crowed in the procedure in FIG. 6.

FIG. 7 shows an example of the criterion for determining as to whether or not the display elements are crowded. If a distance D between center lines 61a and 62a of adjacent display elements 61 and 62 displayed on a display screen 60 falls below the resolution of the touch panel 19, it becomes impossible to identify events of selecting the display elements 61 and 62. Therefore, even if the resolution of the display 18 has a margin and the display elements 61 and 62 can be clearly distinguished from each other, it is made impossible to distinguish events at a time when the user touches the touch panel 19. Such data management can be conducted in the data management 41 in FIG. 1B for use as the determination criterion as to whether or not the display elements are crowed.

That is, the conversion/management 40 determines as to whether or not assignment of touch areas of the touch panel 19 based on the analysis result is crowded in accordance with the predetermined criterion. If it is determined that the assignment of touch areas is crowded, in response to the first touch detection, re-assignment is made so as to enlarge the touch-detected area vicinity, and an event response is executed in response to the detection result of touch of the re-assigned area. If the area of the touch panel 19 assigned as event elements is crowded, it is considered that which event element is selected cannot be determined and malfunction occurs depending on the resolution of the display 18 and the resolution of the touch panel 19. If it is determined that the assignment of touch areas is crowded according to the predetermined criterion, when the first touch is detected, re-assignment is made so as to enlarge the touch detection position vicinity, and the operation of event element selection is determined based on detection of contact position for the re-assignment result. Therefore, the operation, which is surely intended by the digital broadcast receiving person, can be selected.

When a touch operation of the touch panel 19 is not detected within the predetermined time range after the re-assignment, the conversion/management 40 stops re-assignment of areas. Thus, if the position of the touch panel 19 that the digital broadcast receiving person first touches is not appropriate and an enlargement of the touch position vicinity cannot provide any desired operation, when the predetermined time has elapsed, re-assignment is stopped and the assignment is restored to the former assignment state. Therefore, unnecessary operation can be skipped.

Figure 8:
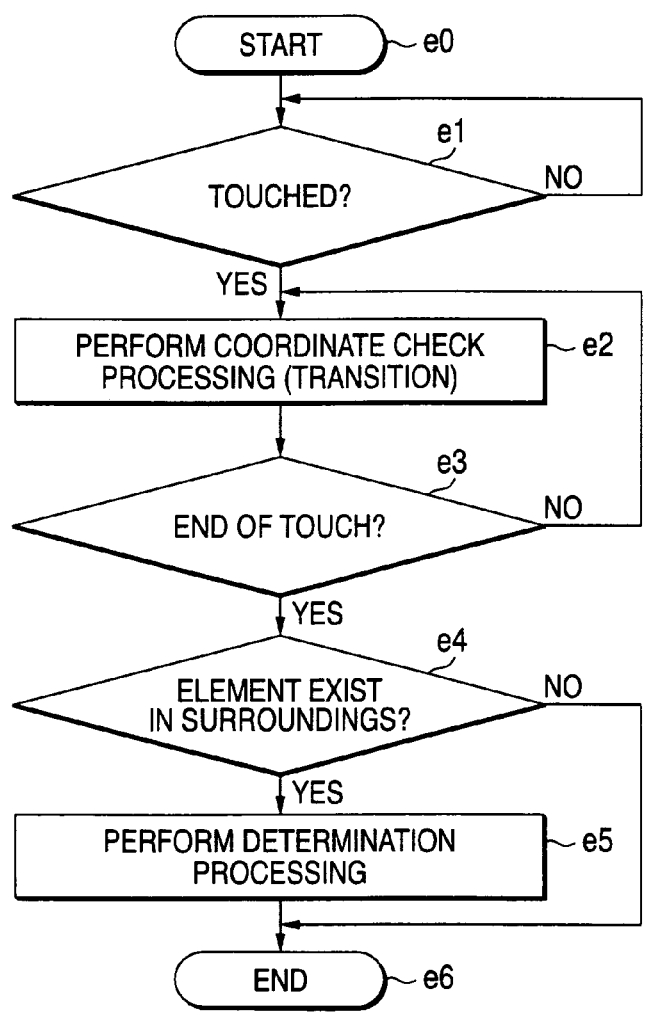
FIG. 8 is a flowchart to show a selection procedure with cursor move in the embodiment in FIG. 1.

FIG. 8 shows a control procedure of the conversion/management 40 for displaying on the display 18 a cursor and event elements, which are associated with predetermined events and can be specified based on the position of the cursor, and associating a movement of a touch position of the touch panel 19 with an event for the remote control to move the cursor. The procedure is started at step e0. At step e1, it is determined repeatedly as to whether or not the user touches the touch panel 19, until the user touches the touch panel 19. When the user touches the touch panel 19, a coordinate check processing for generating a transition event with a movement of touch position is performed at step e2. At step e3, it is determined as to whether or not the touch terminates. If it is determined that the touch does not terminate, control returns to step e2 and the coordinate check processing is repeated. If it is determined at step e3 that the touch terminates, it is determined as to whether or not an element exists in the surroundings of the touch end position at step e4. If it is determined that an element exists, similar determination processing to that when the user presses the DETERMINE key 7b on the remote control 7 as shown in FIG. 11 is performed at step e5 and the procedure is terminated at step e6.

That is, the user operation of stopping touch of the touch panel 19 and breaking away from the touch panel 19 is associated with an event for the remote control to determine the event element at the cursor position. When a cursor is displayed with the image information for the input operation on the display 18, the user moves the cursor by operating an arrow key of the remote control and operates the DETERMINE key, thereby selecting the event element pointed to by the cursor. Instead, equivalent operation can be performed as the digital broadcast receiving person moves the touch position while touching the touch panel 19 and then breaks away from the touch panel 19, thereby selecting the event element indicated at the position.

If it is determined at step e4 in FIG. 8 that an element does not exist in the surroundings of the touch end position, the determination processing at step e5 is skipped and the procedure is terminated at step e6. If an event element does not exist in the image information for the input operation on the display 18 corresponding to the position where the user stops touch of the touch panel 19 and breaks away from the touch panel 19, the operation is not interpreted as determination operation. Therefore, the selection operation can be canceled as a state in which the DETERMINE key of the remote control is not pressed.

Figure 9:
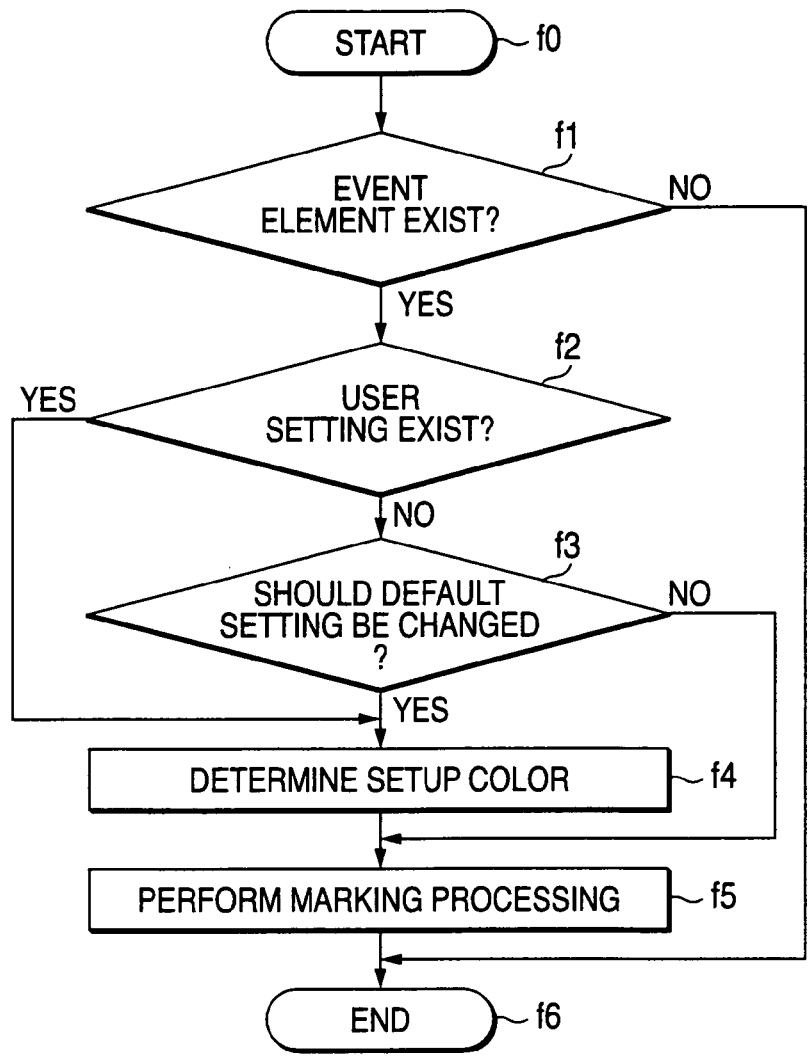
FIG. 9 is a flowchart to show a procedure of displaying an event element so as to distinguish the event element from other display elements in the embodiment in FIG. 1.

FIG. 9 shows a control procedure of the conversion/management 40 for displaying an event element on the display 18 in a display mode preset so that the event element can be distinguished from other images. The procedure is started at step f0. At step f1, it is determined as to whether or not an event element exists. If it is determined that an event element exists, it is determined as to whether or not user setting exists at step f2. If no user setting exists, it is determined as to whether or not default setting should be changed at step f3. If it is found from display screen data that the filling color in the default setting of the event element is close to the color of any other element on the display screen, an automatic determination is made so as to change the default setting. In the automatic determination, setup color is determined at step f4. For example, change color candidates may be preset and a color largely different from the colors of other elements may be selected. If it is determined at step f2 that user setting exists, the default color is changed to the color set by the user of the digital broadcast receiving person at step f4. Next, at step f5, marking processing in the new color is performed and at step f6, the procedure is terminated. If it is determined at step f1 that no event element exists, marking processing is skipped and the procedure is terminated at step f6.

That is, an event element, which causes some event if selected, is displayed in a mode for enabling the user to distinguish the event element from other images as predetermined marking processing. Therefore, the user, namely, the digital broadcast receiving person can determine which element of the display elements can be operated at a glance. If the event element is displayed in a mode of changing the filling display color, the filling color can be changed so as to enable the user to easily distinguish the event element from other elements. The BML browser 33 is used as a change acceptance unit for accepting a filling color change specification to change the filling color of the event element and displays colors of the event elements displayed on the display 18 with changing the filling color in response to the change specification of the user of the digital broadcast receiving person. Therefore, the digital broadcast receiving person can specify any color so as to reflect his/her liking or change the color of the event element hard to see.

As described above, according to the embodiments of the invention, the function of the input operation to the remote control is assigned to an area of the touch panel by the analysis unit. If the user touches the assignment area, equivalent operation is executed as a pseudo input operation to the remote control. Therefore, it is made possible to effectively use broadcast data, which is prepared to presume that the remote control is used in a digital broadcast, without using the remote control.

According to the embodiments of the invention, the image information for the input operation is contained as a content, which is associated with an event caused by an input operation to the remote control and is described in the BML of a broadcast document description language. The image information for the input operation is displayed on the display screen of the display unit. The touch panel is placed on the surface of the display screen. Therefore, if the user touches the area of the touch panel on button display, which the user may select and determine with the remote control, the user can directly perform selection operation to the image information for the input operation. When the user touches the area of the touch panel corresponding to the operation guide display, the reception apparatus is controlled so as to generate an event caused by an input operation to the remote control pseudo-assigned to the area. Therefore, the user can perform a similar operation to that with the remote control, without using the remote control.

According to the embodiments of the invention, the remote control assumed to be used in a data broadcast is provided with special keys and often the special keys are not contained in display of the image information for the input operation only to select an event element. If the special keys are not contained in event elements, when any of the special keys is pressed as an input operation to the remote control, the response operation set in the special key needs to be performed. Thus, the user is enabled to operate the touch panel as the software remote control function. It is realized to cause an event corresponding to an operation to the touch panel.

According to the embodiments of the invention, touch panel areas do not overlap. Therefore, the user can easily distinguish input operation to the software remote control from operation on an event element based on the image information for the input operation.

According to the embodiments of the invention, if the event element area and the software remote control function area overlap on the touch panel, the area assigned for the software remote control function is moved every given time. Therefore, if the event element area is hidden by the operation guide display for the software remote control function, it is made possible to see after the expiration of the given time.

According to the embodiments of the invention, it can be avoided that the software remote control function, which is not operated within the predetermined time, causes complicated display.

According to the embodiments of the invention, since the software remote control function can be started when the user touches the area of the touch panel corresponding to any area other than the area where the image information for the input operation is displayed, the user can appropriately select the software remote control function as required.

According to the embodiments of the invention, if the user gives a voice instruction for starting the software remote control function, the user can start the software remote control function without touching the touch panel and can appropriately select the software remote control function.

According to the embodiments of the invention, the software remote control function is made effective and ineffective repeatedly at preset time intervals. Therefore, the whole image information for the input operation can be displayed without being hidden by the operation guide display for the software remote control function. The operation guide display for the software remote control function can also be used alternately.

According to the embodiments of the invention, an operation of moving the cursor by operating an arrow key of the remote control and operating the DETERMINE key to select the event element pointed to by the cursor can be substituted with an operation of moving the touch position while touching the touch panel and then breaking away from the touch panel to select the event element indicated at the position.

According to the embodiments of the invention, if an event element does not exist at the position where the user breaks away from touch of the touch panel, the selection operation can be canceled.

According to the embodiments of the invention, an event element is displayed in a mode for enabling the user to distinguish the event element from other images. Therefore, the digital broadcast receiving person can determine which element of the display elements can be operated at a glance. For example, the element filling color can be changed so as to enable the user to easily distinguish the event element from other elements. The digital broadcast receiving person can also specify any color so as to reflect his or her liking or change the color of the event element hard to see.

According to the embodiments of the invention, if the area of the touch panel assigned as event elements is crowded, malfunction can be avoided and the operation surely reflecting the intention of the digital broadcast receiving person can be selected.

According to the embodiment of the invention, if the position of the touch panel that the digital broadcast receiving person first touches is not appropriate, when the predetermined time has elapsed, re-assignment is stopped and unnecessary operation can be skipped.

What is claimed is:

1. A digital broadcast reception apparatus for receiving a digital broadcast containing image information for an input operation, wherein the image information accepts the input operation of a user, provides broadcast information reflecting an input operation result, and is prepared to presume that the user operates a key of a remote control having a predetermined function, the remote control being a device that is presumed to be located away from the digital broadcast reception apparatus and is presumed to be handled by the user for purposes of operating the digital broadcast reception apparatus, the digital broadcast reception apparatus comprising:

a touch panel for enabling the user to touch a surface of the touch panel for performing the input operation, the touch panel being different from the remote control;

a display unit for displaying the image information for the input operation;

an analysis unit for analyzing an operation concerning the remote control contained in the image information for the input operation; converting a function, which is presumed to be performed by operating a key of the remote control and that is associated with the input operation to the remote control, into a touch panel function that is to be performed by touching the touch panel; and pseudo-assigning the function of the input operation to the remote control to a touch operation area of the touch panel on the basis of a result of the analyzing and converting; and a control unit being responsive to the touch operation to the touch panel, the control unit for making a response corresponding to a pseudo input operation to the remote control in response to a touched area of the touch panel according to an area assignment of the analysis unit.

2. The digital broadcast reception apparatus according to claim 1, wherein:

the digital broadcast contains the image information for the input operation as a content described in a predetermined document description language for broadcast;

the content is associated with an event caused by the input operation to the remote control;

the touch panel is placed on a surface of a screen on which the display unit displays the image information for the input operation;

the analysis unit displays an operation guide on the display unit corresponding to the area assignment; and when the user touches an area of the touch panel corresponding to the operation guide display, the control unit causes an event, which is caused by the input operation to the remote control assigned to an area of the touch panel corresponding to the operation guide display.

3. The digital broadcast reception apparatus according to claim 1, wherein:

when input operation functions of the remote control contain an input operation function, which is assigned to no area by an analysis of the operation concerning the remote control, the analysis unit assigns a touch operation area of the touch panel for a software remote control function to the input operation function, which is assigned to no area by the analysis of the operation concerning the remote control; and the analysis unit displays an operation guide of the software remote control function on the display unit corresponding to the touch operation area for the software remote control function area.

4. The digital broadcast reception apparatus according to claim 3, wherein:

the analysis unit assigns the touch operation area for the software remote control function to the touch panel so as not to overlap the area assigned by analyzing the operation.

5. The digital broadcast reception apparatus according to claim 4, wherein:

if an appropriate area assigned to the software remote control function does not exist in the touch panel, the analysis unit moves an assigned area every given time.

6. The digital broadcast reception apparatus according to claim 3, wherein
when the user does not perform an input operation to the software remote control function within a predetermined time, the analysis unit stops the assignment to the software remote control function and stops the operation guide display for the software remote control function.

7. The digital broadcast reception apparatus according to claim 3, wherein:
the analysis unit assigns an area for starting the software remote control function to an area of the touch panel where the display unit does not display the image information for the input operation; and
when the control unit detects a touch operation to the area for starting the software remote control function, the software remote control function is started.

8. The digital broadcast reception apparatus according to claim 3, further comprising:
a voice recognition unit for recognizing voice input, wherein:
the analysis unit starts the software remote control function when the voice recognition unit recognizes a predetermined instruction.

9. The digital broadcast reception apparatus according to claim 3, wherein:
the analysis unit switches the assignment to the operation guide display on the display unit corresponding to the touch panel area assigned for the software remote control function between effectiveness and ineffectiveness at preset time intervals.

10. The digital broadcast reception apparatus according to claim 2, wherein:
the analysis unit displays on the display unit a cursor and an event element, which is associated with a predetermined event and can be specified based on a position of the cursor;
the analysis unit associates a movement of a touch position of the touch panel detected by the control unit with an event for the remote control to move the cursor; and
the analysis unit associates an operation of stopping touch of the touch panel and breaking away from the touch panel detected by the control unit with an event for the remote control to determine the event element at the cursor position.

11. The digital broadcast reception apparatus according to claim 10, wherein:
the control unit determines as to whether or not the event element exists in the image information for the input operation on the display unit corresponding to a position where the user stops touch of the touch panel and breaks away from the touch panel; and
when the control unit determines that the event element does not exist, the control unit does not interpret user's operation as the determination operation.

12. The digital broadcast reception apparatus according to claim 2, wherein:
the analysis unit displays an event element on the display unit in a display mode so that the event element is distinguished from other images.

13. The digital broadcast reception apparatus according to claim 1, wherein:
the analysis unit determines as to whether or not assignment of touch areas of the touch panel based on the analysis result is crowded in accordance with a predetermined criterion;
when the analysis unit determines that the assignment of the touch areas is crowded, the analysis unit performs a re-assignment with enlarging the vicinity of the touch areas in response to a first touch detection of the control unit; and
the control unit makes the response in response to a detection result of touch of the re-assigned area by the analysis unit.

14. The digital broadcast reception according to claim 13, wherein:
when the control unit does not detect the touch operation of the touch panel within a predetermined time range after the re-assignment, the analysis unit stops the area re-assignment.

15. A digital broadcast reception apparatus operable to receive a bi-directional digital broadcast containing image information and an input function, the digital broadcast reception apparatus comprising:
a display unit operable to display the image information and the input function;
a touch panel;
an analysis unit; and
a control unit operable to execute the input function, wherein:
the digital broadcast does not contain positioning information which specifies a region on the touch panel, to which the input function is assigned;
the analysis unit is operable to analyze the input function which does not contain the positioning information so that the input function is assigned to the region on the touch panel; and
when a user touches the assigned region on the touch panel, the control unit executes the input function.

16. The digital broadcast reception apparatus according to claim 15, wherein:
the input function includes a plurality of the input functions;
the region includes a plurality of the regions;
when the analysis unit does not assigns at least one of the input functions to the regions on the touch panel on the basis of the analysis result, the analysis unit assigns the at least one of the input functions to an other region on the touch panel so that the at least one of the input functions is displayed so as not to overlap the other displayed input functions.

17. The digital broadcast reception apparatus according to claim 16, wherein:
when it is impossible for the analysis unit assigns the at least one of the input functions to the other region on the touch panel so that the at least one of the input functions is displayed so as not to overlap the other displayed input functions, the analysis unit changes a position to which the at least one of the input functions is assigned at a predetermined interval.

18. The digital broadcast reception apparatus according to claim 16, wherein:
when the user touches a still other region on the touch panel where the input functions are not displayed, the analysis unit begins the assignment of the at least one of the input functions.

19. The digital broadcast reception apparatus according to claim 15, wherein:
the analysis unit determines as to whether or not the regions to which the input functions are assigned are closer to each other than a predetermined criterion;
when the analysis unit determines that the regions to which the input functions are assigned are closer to other than a predetermined criterion and the user touches at least one of the close regions, the control unit controls the display unit to perform an enlarged display of the vicinity of the touched at least one of the close regions.

20. The digital broadcast reception apparatus according to claim 15, wherein:

the display unit and the touch panel are integrated.

21. A digital broadcast reception method for receiving a bi-directional digital broadcast containing image information and an input function, to which the input function is assigned, the digital broadcast reception method comprising:

displaying the image information and the input function on a display;

analyzing the image input function which does not contain positioning information which specifies a region on the touch panel, to which the input function is assigned;

assigning the put functions to the region on the touch panel on the basis of the analyzing; and when a user touches the assigned region on the touch panel, executing the input function.

* * * * *